United States Patent
Cotta

(10) Patent No.: US 11,133,932 B2
(45) Date of Patent: Sep. 28, 2021

(54) SECURE DATA CHANNEL IN A NETWORKED GAMING SYSTEM

(71) Applicant: Sony Interactive Entertainment LLC, San Mateo, CA (US)

(72) Inventor: Bryan Cotta, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 238 days.

(21) Appl. No.: 16/228,461

(22) Filed: Dec. 20, 2018

(65) Prior Publication Data

US 2020/0204368 A1 Jun. 25, 2020

(51) Int. Cl.
*H04L 9/08* (2006.01)
*H04L 9/30* (2006.01)
(Continued)

(52) U.S. Cl.
CPC .......... *H04L 9/0875* (2013.01); *A63F 13/71* (2014.09); *A63F 13/79* (2014.09); *A63F 13/87* (2014.09);
(Continued)

(58) Field of Classification Search
CPC . H04L 9/08; H04L 9/0875; H04L 9/30; H04L 9/32; H04L 9/3215; H04L 9/14; H04L 9/0833; H04L 9/0825; H04L 9/0822; H04L 9/321; H04L 9/0894; H04L 9/3242; H04L 63/04; H04L 63/0428; H04L 9/083; H04L 9/0891; H04L 9/0897; H04L 63/045; A63F 13/71; A63F 13/79; A63F 13/87;
(Continued)

(56) References Cited

U.S. PATENT DOCUMENTS 7,013,389 B1* 3/2006 Srivastava ............ H04L 9/0822
713/163
8,086,847 B2* 12/2011 Singh .................... H04L 9/083
713/151
(Continued)

FOREIGN PATENT DOCUMENTS

FR WO-2012048347 A1 * 4/2012 ............... H04L 9/32

OTHER PUBLICATIONS

Integrity Based Relationships and Trustworthy Communication between Network Participants by Alexander Oberle, Pedro Larbig, Nicolai Kuntze and Carsten Rudolph pp. 6; IEEE (Year: 2014).*
(Continued)

*Primary Examiner* — Samson B Lemma
*Assistant Examiner* — Ali H. Cheema
(74) *Attorney, Agent, or Firm* — Penilla IP, APC

(57) ABSTRACT

A method includes: initiating a data channel over a networked gaming service, including generating a channel key, the channel key being used to encrypt content communicated over the data channel, and generating a first encrypted channel key by encrypting the channel key with a public key associated to an owner of the data channel; adding a participant to the data channel, including generating a second encrypted channel key by encrypting the channel key with a public key associated to the participant; wherein a message sent via the data channel includes encrypted content generated by using the channel key to encrypt content for the message, and further includes the first encrypted channel key and the second encrypted channel key.

11 Claims, 12 Drawing Sheets

(51) Int. Cl.
*H04L 9/32* (2006.01)
*A63F 13/71* (2014.01)
*A63F 13/79* (2014.01)
*A63F 13/87* (2014.01)
*H04L 29/06* (2006.01)
*G06F 21/62* (2013.01)
*H04L 9/14* (2006.01)

(52) U.S. Cl.
CPC ............. *H04L 9/30* (2013.01); *H04L 9/3215* (2013.01); *H04L 63/0428* (2013.01); *A63F 2300/401* (2013.01); *A63F 2300/572* (2013.01); *G06F 21/6209* (2013.01); *G06F 21/6218* (2013.01); *H04L 9/14* (2013.01)

(58) Field of Classification Search
CPC ......... A63F 2300/401; A63F 2300/572; G06F 11/1469; G06F 21/6209; G06F 21/6218
USPC .............. 713/171, 163, 151, 165, 152, 168; 380/270, 277, 28, 44, 202, 278; 726/26
See application file for complete search history.

(56) References Cited

U.S. PATENT DOCUMENTS

| | | | | |
|---|---|---|---|---|
| 8,649,515 | B1* | 2/2014 | Zhao | G06F 21/6209 380/202 |
| 8,954,740 | B1* | 2/2015 | Moscaritolo | H04L 9/14 713/171 |
| 9,697,378 | B2* | 7/2017 | Keohane | H04L 9/0894 |
| 10,230,702 | B1* | 3/2019 | Moritz | H04L 9/3215 |
| 2002/0021804 | A1* | 2/2002 | Ledzius | H04L 9/0897 380/44 |
| 2002/0025044 | A1* | 2/2002 | Saito | H04N 7/1675 380/278 |
| 2002/0029350 | A1* | 3/2002 | Cooper | H04L 12/1822 726/26 |
| 2006/0020786 | A1* | 1/2006 | Helms | H04L 63/045 713/165 |
| 2006/0159269 | A1* | 7/2006 | Braun | H04L 9/321 380/277 |
| 2008/0165958 | A1* | 7/2008 | Matsushita | H04L 9/0891 380/44 |
| 2012/0177198 | A1* | 7/2012 | Cabos | H04L 9/3242 380/270 |
| 2012/0311329 | A1* | 12/2012 | Medina | G06F 21/606 713/168 |
| 2014/0164776 | A1* | 6/2014 | Hook | G06F 21/6218 713/171 |
| 2015/0312260 | A1* | 10/2015 | Kim | H04L 51/32 713/152 |
| 2015/0312759 | A1* | 10/2015 | Kim | H04L 9/085 455/411 |
| 2015/0378842 | A1* | 12/2015 | Tomlinson | G06F 11/1469 380/28 |
| 2017/0012950 | A1* | 1/2017 | Kim | H04L 9/0891 |
| 2017/0111371 | A1* | 4/2017 | Cotta | H04L 9/0833 |
| 2017/0126642 | A1* | 5/2017 | Basin | H04L 9/3247 |

OTHER PUBLICATIONS

A Scalable Architecture for Supporting Interactive Games on the Internet by Wentong CAI, Percival Xavier, Stephen J. Turner and Bu-Sung Lee pp. 8; IEEE (Year: 2002).*

Talking To Strangers: Authentication in Ad-Hoc Wireless Networks by Dirk Balfanz, D. K. Smetters, Paul Stewart and H. Chi Wong (Xerox Palo Alto Research Center) pp. 14; February (Year: 2002).*

Canetti R. et al.: "Multicast Security: A Taxonomy and Some Efficient Constructions", Proceedings IEEE Infocom '99. The Conference on Computer Communications. 18th Annual Joint Conference of the IEEE Computer and Communications Societies. New York, NY, Mar. 21-25, 1999; [Proceedings IEEE Infocom. The Conference on Computer Communic, vol. 2, Mar. 21, 1999 (Mar. 21, 1999), pp. 708-716, XP000870749, ISBN: 978-0-7803-5418-0 *Section "Introduction" *.

Micciancio, Daniele et al.: "Multicast Encryption", Apr. 27, 2017 (Apr. 27, 2017), XP055678606, Retrieved from the Internet: URL:https://web.archive.org/web/20170427123359/http://cseweb.ucsd.edu/spanjwan/multicast.html [retrieved on Mar. 23, 2020] *Section "Previous Work" *.

PCT International Search Report and Written Opinion of the International Searching Authority issued in corresponding International Patent Application No. PCT/US20191065825 dated Jul. 16, 2020 (PCT Forms ISA 220, 210, 237) (21 total pages).

* cited by examiner

SECURE DATA CHANNEL IN A NETWORKED GAMING SYSTEM

RELATED APPLICATIONS

This application is related to U.S. application Ser. No. 14/882,651 (issued as U.S. Pat. No. 9,843,592), filed Oct. 14, 2015, entitled "Fast Multicast Messaging Encryption and Authentication," the disclosure of which is incorporated by reference herein.

FIELD OF THE DISCLOSURE

The present disclosure relates to systems and methods for a secure data channel in a networked gaming system, that enables secure sharing of information, protecting user privacy of user-generated data.

BACKGROUND

Description of the Related Art

A current area of rapidly growing technology is the field of video gaming, now encompassing a multitude of gaming platforms, including dedicated gaming consoles, personal computers (PC), and more recently, cloud gaming and mobile devices. Gameplay is increasingly social as players desire social interactions centered around gaming. As a result, networked gaming services/systems have been developed including mechanisms for communication between players, enabling communication and social interaction both during gameplay and outside of gameplay but still within the context of video gaming platforms. One example of a networked gaming service/system is the PlayStation® Network, which includes various gaming services supporting both console-based and cloud-based gaming.

In a cloud gaming setup, users are able to access a number of games on a cloud gaming site over a network, such as the Internet, and begin interaction/playing the game. In order to select a game for game play, a user accesses his/her account on the cloud gaming site, and initiates one of a plurality of games that are available to the user account for game play. The video generated from the cloud video game is transported to a client device. One example of a cloud gaming system is the Playstation® Now cloud gaming service.

It is within this context that embodiments of the disclosure arise.

SUMMARY OF THE DISCLOSURE

Implementations of the present disclosure provide methods and systems that are used to provide a secure data channel for sharing of information in a cloud gaming system.

In some implementations a method is provided, including the following operations: initiating a data channel over a networked gaming service, including generating a channel key, the channel key being used to encrypt content communicated over the data channel, and generating a first encrypted channel key by encrypting the channel key with a public key associated to an owner of the data channel; adding a participant to the data channel, including generating a second encrypted channel key by encrypting the channel key with a public key associated to the participant; wherein a message sent via the data channel includes encrypted content generated by using the channel key to encrypt content for the message, and further includes the first encrypted channel key and the second encrypted channel key.

In some implementations, upon receipt of the message by a user device associated to the owner, the channel key is decrypted from the first encrypted channel key using a private key associated to the owner, and the decrypted channel key is further used to decrypt the encrypted content of the message.

In some implementations, upon receipt of the message by a user device associated to the participant, the channel key is decrypted from the second encrypted channel key using a private key associated to the participant, and the decrypted channel key is further used to decrypt the encrypted content of the message.

In some implementations, the method further includes: removing the participant from the data channel, including generating a second channel key, and generating a third encrypted channel key by encrypting the second channel key with the public key that is associated to the owner.

In some implementations, the second channel key is not encrypted with the public key that is associated to the participant.

In some implementations, the method further includes: adding a second participant to the data channel, including generating a third encrypted channel key by encrypting the channel key with a public key associated to the second participant.

In some implementations, the message sent via the data channel further includes the third encrypted channel key.

In some implementations, a method is provided, including the following operations: receiving, over a network from an owner device associated to an owner of a data channel, a first encrypted channel key for the data channel, the first encrypted channel key being a channel key that is encrypted with a public key associated to the owner of the data channel, the channel key being used to encrypt content shared through the data channel; receiving, over the network from the owner device, one or more secondary encrypted channel keys, each secondary encrypted channel key respectively being the channel key that is encrypted with a public key associated to a respective participant of the data channel; storing the first encrypted channel key and the one or more secondary encrypted channel keys to a channel list; distributing, over the network, the channel list to one or more participant devices that are respectively associated to each participant of the data channel; wherein communications over the data channel include the first encrypted channel key, the secondary encrypted channel keys, and content encrypted using the channel key.

In some implementations, upon receipt of a communication, over the data channel, by the owner device, the channel key is decrypted from the first encrypted channel key using a private key associated to the owner, and the decrypted channel key is further used to decrypt the encrypted content of the communication.

In some implementations, upon receipt of a communication, over the data channel, by a participant device, the channel key is decrypted from a secondary encrypted channel key using a private key associated to the participant, and the decrypted channel key is further used to decrypt the encrypted content of the communication.

In some implementations, the method further includes: receiving, over a network from the owner device a first encrypted second channel key for the data channel, the first encrypted second channel key being a second channel key that is encrypted with the public key associated to the owner of the data channel, the second channel key being used to encrypt content shared through the data channel, to the exclusion of at least one of the participants; receiving, over the network from the owner device, one or more secondary encrypted second channel keys, each secondary encrypted second channel key respectively being the second channel key encrypted with the public key of one of the participants, wherein the one or more secondary encrypted second channel keys do not include a secondary encrypted second channel key that is the second channel key encrypted with the public key of the at least one of the participants that are excluded; updating the channel list to include the first encrypted second channel key and the one or more secondary encrypted second channel keys;

distributing, over the network, the updated channel list to the participant devices.

In some implementations, additional communications over the data channel include the first encrypted second channel key, the secondary encrypted second channel keys, and content encrypted using the second channel key.

In some implementations, the method further includes: storing the communications over the data channel; storing the additional communications over the data channel.

In some implementations, the channel key enables access to the content of the stored communications by the at least one of the participants that are excluded, and wherein the second channel key prevents access to the content of the stored additional communications by the at least one of the participants that are excluded.

In some implementations, a non-transitory computer readable medium having program instructions embodied thereon is provided, that, when executed by at least one processor, cause said at least one processor to perform a method including the following operations: initiating a data channel over a networked gaming service, including generating a channel key, the channel key being used to encrypt content communicated over the data channel, and generating a first encrypted channel key by encrypting the channel key with a public key associated to an owner of the data channel; adding a participant to the data channel, including generating a second encrypted channel key by encrypting the channel key with a public key associated to the participant; wherein a message sent via the data channel includes encrypted content generated by using the channel key to encrypt content for the message, and further includes the first encrypted channel key and the second encrypted channel key.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As the field of video gaming continues to grow in popularity, there is an ever greater abundance of user-generated information related to video games. The gaming experience has grown to facilitate greater social interaction, such as through text/audio/video chats, audio feeds, video feeds, screenshots, video clips, social postings, comments, etc. Furthermore, as cloud gaming expands, more and more user information is being stored in the cloud, rather than being stored locally. Thus, it is desirable to ensure user data security and privacy while also enabling users to control access to data in accordance with their preferences.

As noted above, a networked gaming service/system such as the PlayStation® Network can provide various gaming services supporting both console-based and cloud-based gaming. However, while such a networked gaming service may provide communication and social services to users, users' content and information shared through such services may not be secure and are visible to the networked gaming service provider. For example, such content can be intercepted by a malicious party. Also, if the networked gaming service is hacked, then the users' information and content can be exposed.

In view of the above, implementations of the present disclosure provide a secure data channel for communication between users of a networked gaming service. The data channel can be instantiated and controlled by one of the users who is an owner/admin of the data channel, including control of adding and removing users from the data channel. Content shared through the data channel can be encrypted so as to be readable by only the users of the data channel.

For ease of description, throughout the present disclosure, it will be appreciated that references to a "user" will often be synonymous with a user device that is associated to or operated by the user, as the user typically interfaces with systems in accordance with the present disclosure by using or operating a user device. Thus, while the term "user" is used for ease of description in the present disclosure, it will be appreciated that the term "user" can encompass both the user as well as a user device that is operated by the user or otherwise associated therewith, and further the terms "user" and "user device" may often be used interchangeably in the present description of the implementations, as will be apparent to those skilled in the art.

Figure 1A:
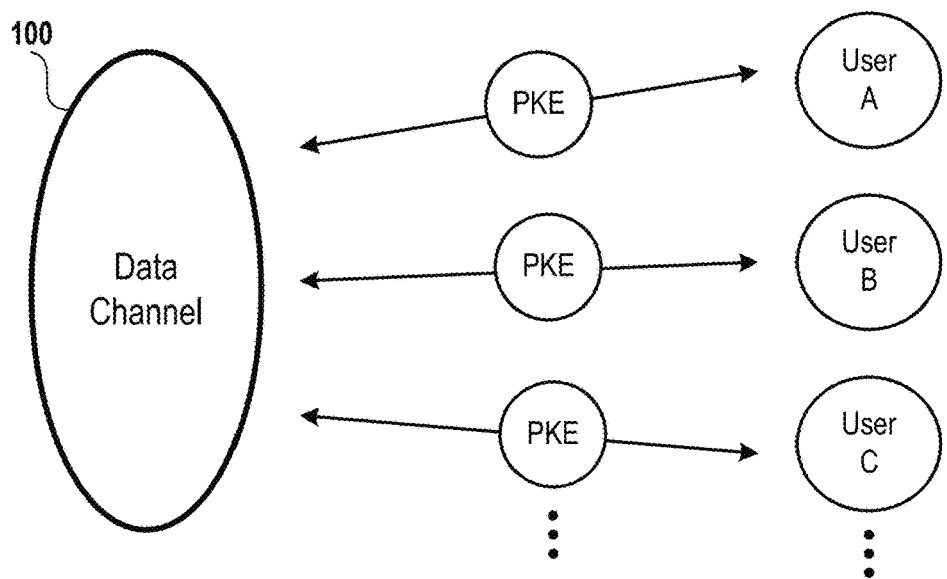
FIG. 1A conceptually illustrates a public key exchange between a data channel and a plurality of users, in accordance with implementations of the disclosure.

FIG. 1A conceptually illustrates a public key exchange between a data channel and a plurality of users, in accordance with implementations of the disclosure. A data channel 100 is shown, which will be understood as a persistent session in which multiple users participate. The data channel 100 is configured to store user-generated content or information and make such content/information available for access by the participating users. In some implementations, the data channel 100 can be conceptualized as a stream of user-generated or user-contributed content, with the stream logging or serving as a repository for the content contributions that are shared to the data channel 100. Such content contributions are then accessible to anyone that has permission to access the stream that is defined by the data channel 100.

To facilitate data security, in the illustrated implementation, a public key exchange is performed for each user that has permission to access the data channel 100. That is, in the illustrated implementation, a public key of the data channel 100 is provided to the user A and stored by user A, and a public key of the user A is provided to the data channel 100 and stored by data channel 100. Communication from the data channel 100 to the user A can be encrypted using the public key of the user A, and communication from the user A to the data channel 100 can be encrypted using the public key of the data channel 100.

Similarly, in the illustrated implementation, the public key of the data channel 100 is provided to the user B and stored by user B, and a public key of the user B is provided to the data channel 100 and stored by data channel 100. Communication from the data channel 100 to the user B can be encrypted using the public key of the user B, and communication from the user B to the data channel 100 can be encrypted using the public key of the data channel 100.

Similarly, in the illustrated implementation, the public key of the data channel 100 is provided to the user C and stored by user C, and a public key of the user C is provided to the data channel 100 and stored by data channel 100. Communication from the data channel 100 to the user C can be encrypted using the public key of the user C, and communication from the user C to the data channel 100 can be encrypted using the public key of the data channel 100.

Figure 1B:
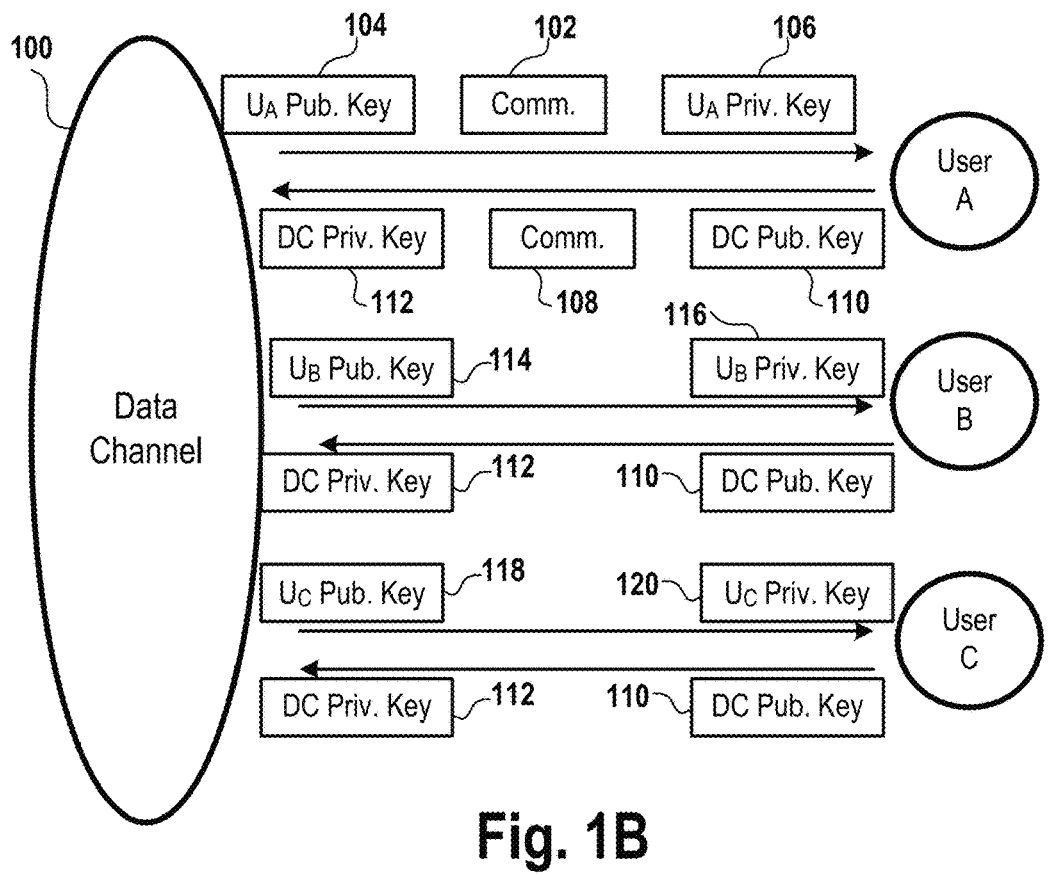
FIG. 1B further illustrates handling of communications between the data channel 100 and users of the data channel 100, in accordance with implementations of the disclosure.

FIG. 1B further illustrates handling of communications between the data channel 100 and users of the data channel 100, in accordance with implementations of the disclosure. In the illustrated implementation, a communication 102 from the data channel 100 to the user A can be encrypted using user A's public key 104. Upon receiving the communication 102, user A decrypts the communication 102 using user A's private key 106, rendering the content of the communication 102. When user A sends a communication 108 to the data channel 100, the communication 108 can be encrypted using the data channel 100 public key 110. Upon receipt of the communication 108, the communication 108 is decrypted using the data channel 100 private key 112, rendering the content of the communication 108.

Similar handling of communications between the data channel 100 and the users B and C also occur. In the illustrated implementation, a communication from the data channel 100 to the user B can be encrypted using user B's public key 114; and upon receipt, user B decrypts the communication using user B's private key 116, thereby rendering the content of the communication. When user B sends a communication to the data channel 100, the communication can be encrypted using the data channel 100 public key 110; and upon receipt, the communication is decrypted using the data channel 100 private key 112, rendering the content of the communication. Further in the illustrated implementation, a communication from the data channel 100 to the user C can be encrypted using user C's public key 118; and upon receipt, user C decrypts the communication using user C's private key 120, thereby rendering the content of the communication. When user C sends a communication to the data channel 100, the communication can be encrypted using the data channel 100 public key 110; and upon receipt, the communication is decrypted using the data channel 100 private key 112, rendering the content of the communication.

Figure 2:
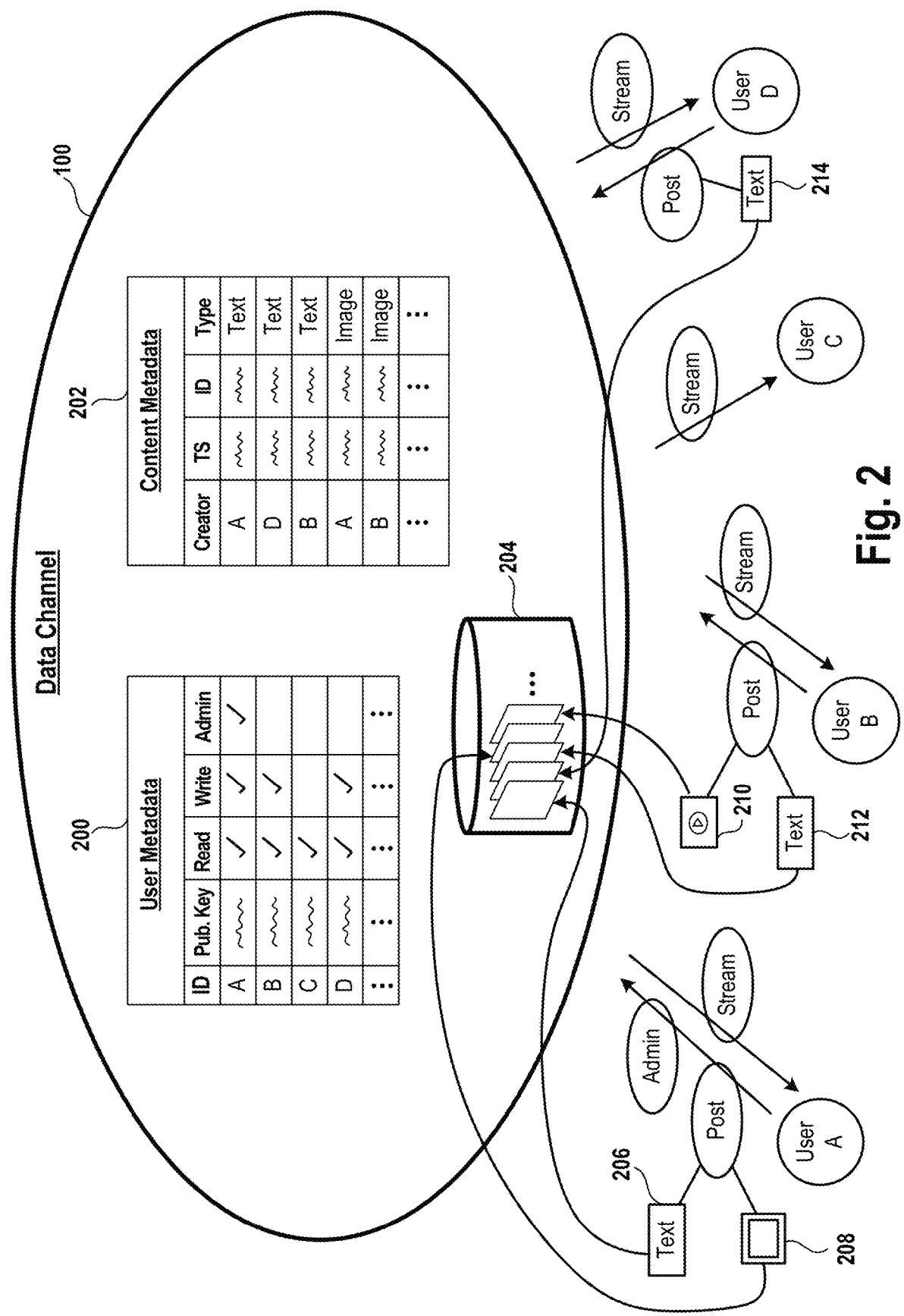
FIG. 2 illustrates interactions with a data channel 100 by several users, in accordance with implementations of the disclosure.

FIG. 2 illustrates interactions with a data channel 100 by several users, in accordance with implementations of the disclosure. As described, the data channel 100 defines a persistent session in which user-generated content is stored and made accessible to users having access to the data channel 100.

In some implementations the data channel 100 can be initiated by a specific user of a networked gaming service, such as user A in the illustrated implementation. User A is thus the owner of the data channel 100 with administrative privileges to manage the data channel 100. The user A may invite other users of the networked gaming service to join the data channel 100, such as the users B, C, and D in the illustrated implementation. As the administrator of the data channel 100, the user A controls who may access the data channel 100, and may further determine what privileges other users are granted, such as whether they may read/view/access the content of the data channel 100, access only certain types of content, post/write/add content to the data channel 100, post only certain types of content, invite others to read and/or post to the data channel 100, delete content from the data channel 100, edit content in the data channel 100, etc. The data pertaining to users of the data channel 100 as described above can be stored as user metadata 200, which as shown, may include the ID's of users, their respective public keys, and specific privileges.

It will be appreciated that when a new user is added to the data channel 100, then a public key exchange between the data channel 100 and the new user can be performed as described above, so that communications between the data channel 100 and the new user can be encrypted accordingly. The public key of the new user, along with their ID and privilege information are stored as part of user metadata 200.

The data channel 100 is defined so that multiple users may share content with each other in a secure manner. Such user-generated content is stored to a content storage 204. Furthermore, information related to the user-generated content is stored as content metadata 202. Non-limiting examples of content metadata include the ID of the creator of a content item, a timestamp of when the content item was posted, a unique identifier for the content item, a type of the content (e.g. text, image, video, etc.), keywords/tags, descriptors, categorizations, etc.

In the illustrated implementation, the user A contributes/posts text item 206 to the data channel 100, and later posts an image 208 to the data channel 100. The user B posts a text item 212, and later a video 210 to the data channel 100. The user D posts a text item 214 to the data channel 100. It will be appreciated that in accordance with implementations of the disclosure, the communications from the users to post their respective content items, can be encrypted with the data channel 100 public key. The user C does not have write privileges for the data channel 100, and thus there are no postings to the data channel 100 from user C.

In the illustrated implementation, all of the users have read privileges for the data channel 100, and thus, they are all able to view and access the various content that has been posted to the data channel 100. In some implementations, the interface through which the content of the data channel 100 is accessed can be in the form of a feed or content stream. In some implementations, the content is accessed through an interface having different sections that organize the content by content type. In some implementations the content is provided in the form of a chat log. Regardless of the specific interface format through which content is presented, it will be appreciated that the content can be securely transmitted from the data channel 100 to the users by encrypting the content with the respective public keys of the various users.

It will be appreciated that any of various types of content can be shared via the data channel 100. For example text, images, audio, video, and combinations thereof can all be shared. In the context of cloud gaming, such content can originate from various sources or interactions relating to cloud gaming. By way of example without limitation, examples include chat logs, game event logs, recorded audio of user audio chats, screenshots, gameplay video clips, recorded video of users' local environments, web links, etc.

In some implementations, content shared via the data channel 100 can include live streaming of gameplay video from a live video gaming session to the data channel 100. That is, a live video feed of a user's gaming session can be made available to other users of the data channel 100 to spectate. In some implementations, the live video can further include live video from a user's local camera (e.g. personal webcam) that may show video of the user. It will be appreciated that such live video sharing can be sensitive, and therefore user's may wish to ensure the privacy of such sharing, and the data channel 100 provides a mechanism to enable such sharing while protecting user privacy and security of user information.

In some implementations, a user can configure the data channel 100 to automatically log certain types of events. It will be appreciated that the user can authorize such automatic sharing to the data channel 100 through an interface that enables selection of the types of content to specifically share to the data channel 100. In this manner, the data channel 100 can be automatically populated with the selected types of content. In various implementations, any of the types of content described herein as shareable via the data channel 100 can be configured to be automatically shared to the data channel 100.

In some implementations, data channel 100 can be instantiated for a specific gaming session or event occurring on the cloud gaming system. For example the data channel 100 may be defined for a multi-player session of a video game, with content from the multi-player session being shared to the data channel 100. In some implementations, the players of the multi-player session (e.g. players that form a team for the video game session) are provided access to the data channel 100, so that they may have a secure channel for sharing and communication.

It will be appreciated that the data channel 100 may also be closed or terminated by a user having administrative privileges. For example, the user A in the illustrated implementation may have the ability to close the data channel 100 so that no further information may be shared to the data channel 100. In some implementations, users may still be permitted to view the data channel 100, but will not be able to add any new information to the data channel 100. This can be considered equivalent to the user A removing the write privileges of all the users, while retaining the read privileges of the users.

Figure 3:
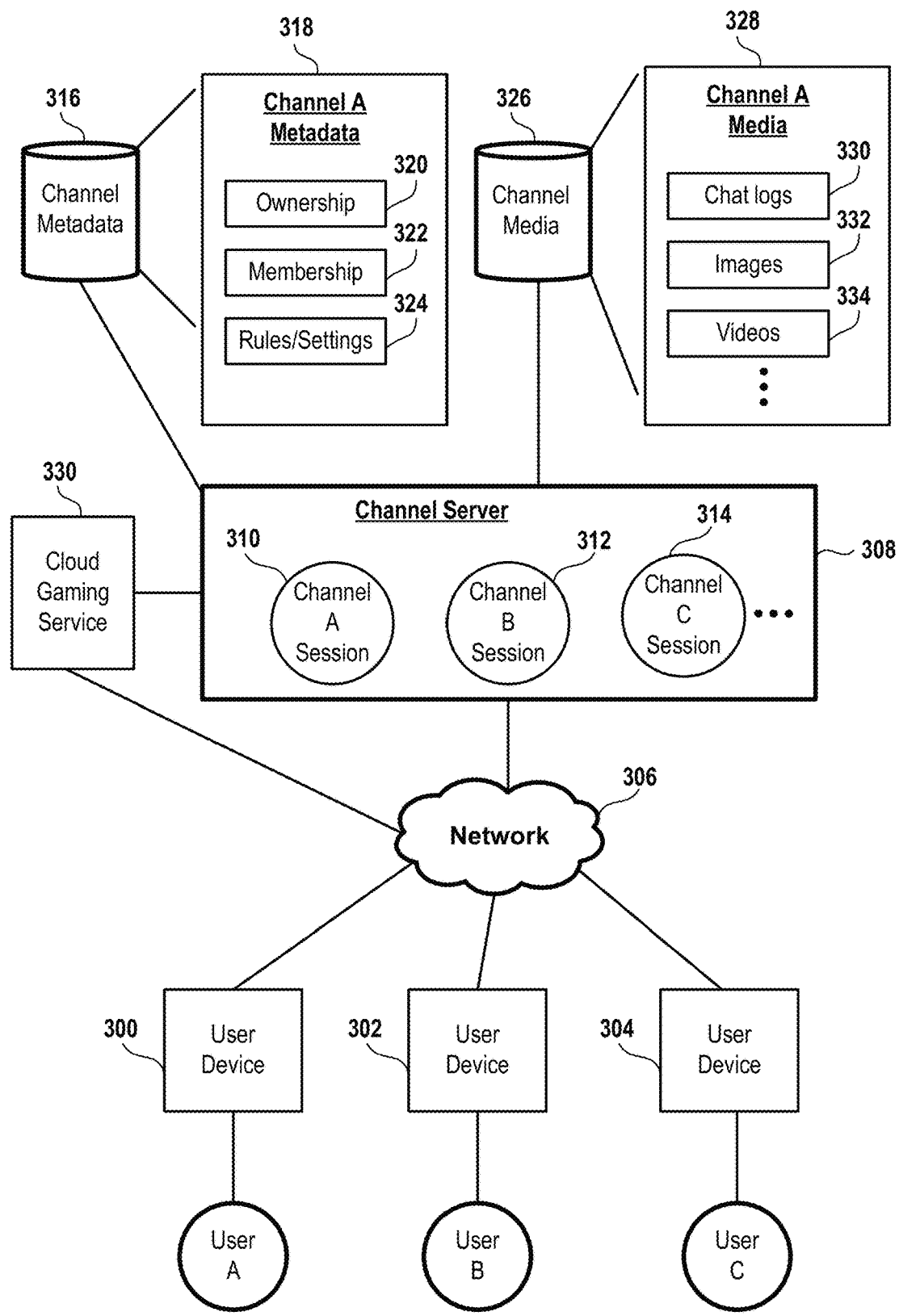
FIG. 3 conceptually illustrates a system for providing data channels for sharing of information, in accordance with implementations of the disclosure.

FIG. 3 conceptually illustrates a system for providing data channels for sharing of information, in accordance with implementations of the disclosure. In the illustrated implementation, user A, user B, and user C, respectively operate user/client devices 300, 302, and 304. The user devices 300, 302, and 304 communicate over network 306 with a channel server 308. The channel server 308 instantiates the data channel sessions, such as data channel session 310, 312, and 314 in the illustrated implementation. It will be appreciated that each data channel session provides the functionality for a distinct data channel in accordance with implementations of the disclosure, including receiving content, storing the content, and sharing the content over the network to users having permission to access the content of the data channel.

In the illustrated implementation, the data channel sessions access channel metadata storage 316 and channel media storage 326. The channel metadata storage 316 contains metadata for each of the data channels. By way of example without limitation, channel metadata 318 is defined for the data channel session 310, and can include ownership information 320 which identifies an owner or owners of the data channel, membership information 322 which identifies the members of the data channel and their respective privileges for interaction with the data channel, and rules/settings for the data channel session 310.

Further in the illustrated implementation, the data channel sessions access channel media storage 316, which contains the content to be shared via the data channel. In the illustrated implementation, the channel media storage 326 includes, by way of example, channel media 328 which includes various media/content items that have been shared through the data channel. In the illustrated implementation this includes chat/game logs 330, images 352, and video 334. It will be appreciated that other types of content/media, as are discussed in the present disclosure, can be shared via the data channel.

Also shown in the illustrated implementation is networked gaming service 330, which can include various server computers and/or game machines that provide support for console/cloud gaming services, enabling the users to access and play video games and associated communication and content generation services, such as audio/text chat services, screenshot/gameplay video saving and processing, etc. Content for the data channels can be generated from interactions with the networked gaming service 330, including gameplay interactions and user-to-user communication interactions, and as such the channel server 308, and more specifically the channel sessions, may receive content for their respective data channels from the networked gaming service 330.

Figure 4:
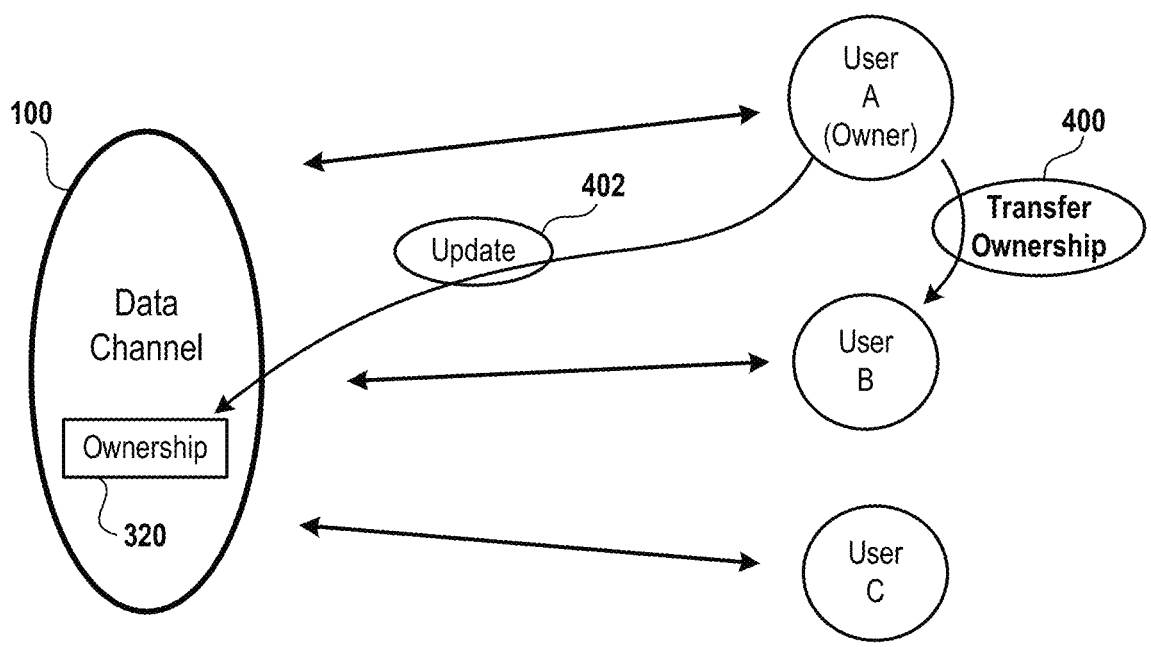
FIG. 4 conceptually illustrates transfer of ownership of a data channel 100, in accordance with implementations of the disclosure.

FIG. 4 conceptually illustrates transfer of ownership of a data channel 100, in accordance with implementations of the disclosure. In a typical scenario, a data channel 100 will have an owner that is typically the user that initiates the data channel 100. For example, in the illustrated implementation the user A is the current owner of the data channel 100, and as the owner, administrates the data channel 100 including controlling membership and settings of the data channel 100. However, the user A may no longer wish to administrate the data channel 100. Therefore, in some implementations the user A may transfer ownership of the data channel 100 to another user. In the illustrated implementation the user A is conceptually shown transferring ownership of the data channel 100 to the user B, as indicated at ref. 400. In so doing, the user A initiates a transaction to update the ownership information 320 (ref. 402) to reflect that user B is the owner of the data channel 100 and now possesses administrative privileges with respect to the data channel 100.

Figure 5:
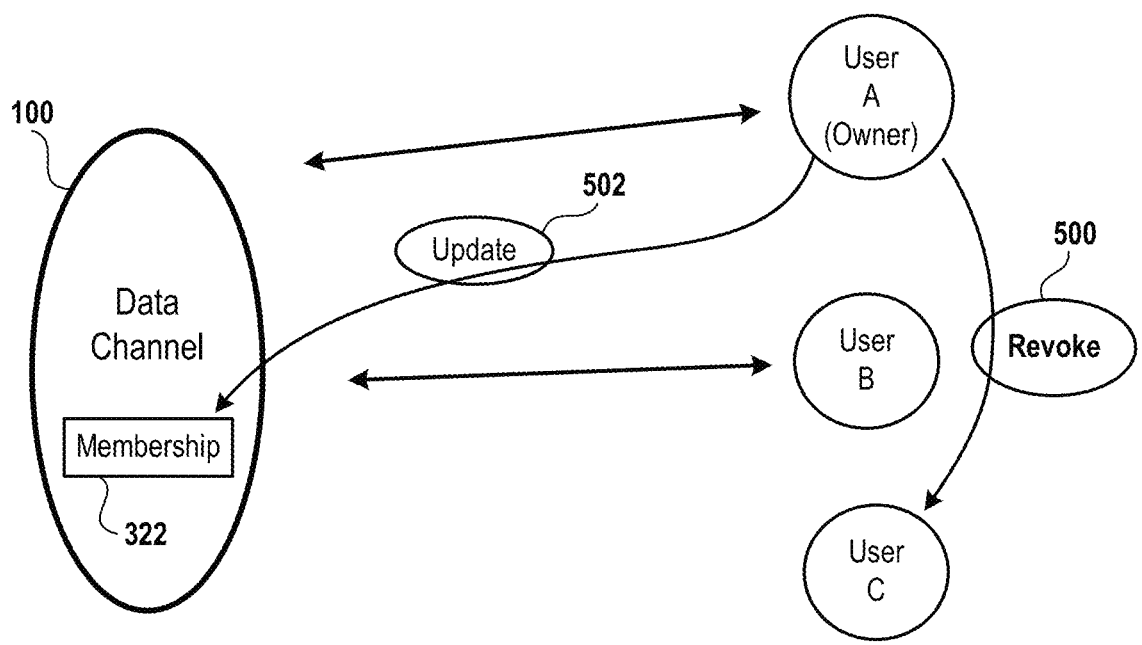
FIG. 5 conceptually illustrates revocation of access to a data channel 100, in accordance with implementations of the disclosure.

FIG. 5 conceptually illustrates revocation of access to a data channel 100, in accordance with implementations of the disclosure. In the illustrated implementation, the user A is the channel owner with administrative privileges for the data channel 100, and as conceptually shown at ref. 500, the user A revokes the access of user C to the data channel 100. To accomplish this, the user A initiates a transaction to update the membership information 322 (ref. 502) of the data channel 100 so that user C is no longer granted access to the data channel 100. In some implementations, this entails changing a setting of the membership information 322 pertaining to user C (e.g. disabling read/write privileges of user C) so that content of the data channel 100 is no longer published using the public key of the user C. In some implementations, the user C's public key and/or other information is removed or deleted from the membership information.

Figure 6:
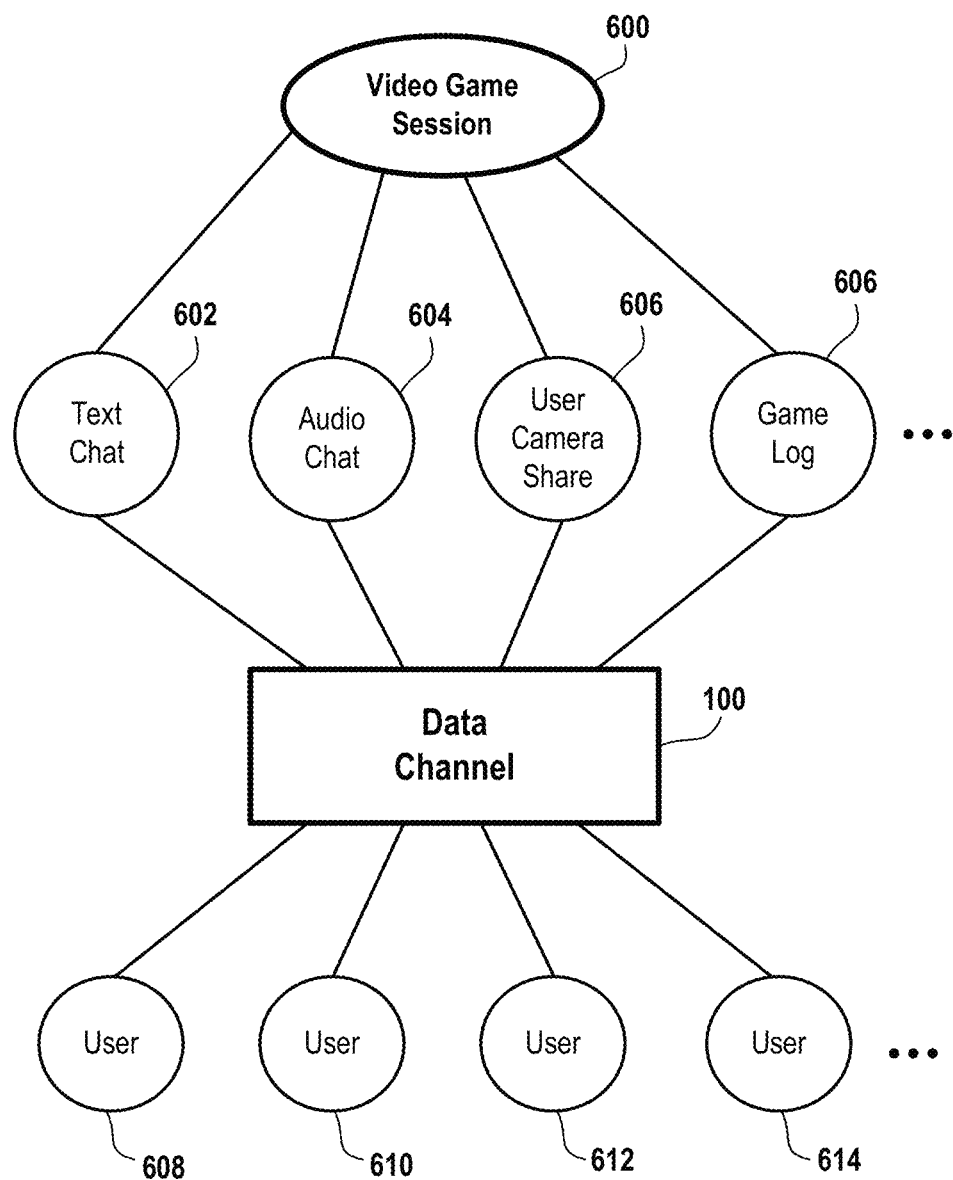
FIG. 6 conceptually illustrates game-related communications/data being transmitted through an encrypted data channel, in accordance with implementations of the disclosure.

FIG. 6 conceptually illustrates game-related communications/data being transmitted through an encrypted data channel, in accordance with implementations of the disclosure. It will be appreciated that real-time activity occurring during a gaming session can be shared through an encrypted data channel, to protect user data privacy. In the illustrated implementation a video game session 600 is executed, which defines the active game state of the video game being played by a plurality of users 608, 610, 612, and 614. During the video game session 600, several associated communications and data services are provided for the users interactivity. By way of example without limitation, these such services may include the following: a text chat service 602 that provides for text-based communication between the users; an audio chat service 604 that provides for audio communication between the users (e.g. speech audio from microphones associated with or operated by the users); a user camera share service 606 that provides for sharing of video from users' respective cameras in their respective local environments (e.g. to provide video of the users themselves so that others may see them); a game log service 606 that displays and logs game activity/events so that users may better comprehend events occurring during the video game session. For each of these services, as well as others in accordance with implementations of the disclosure, the data transmitted to the users and data received from the users can be encrypted via the data channel 100. Thus, the sensitive data provided by the associated services that are related to the video game session is handled so as to ensure user privacy and protection of the data.

Figure 7:
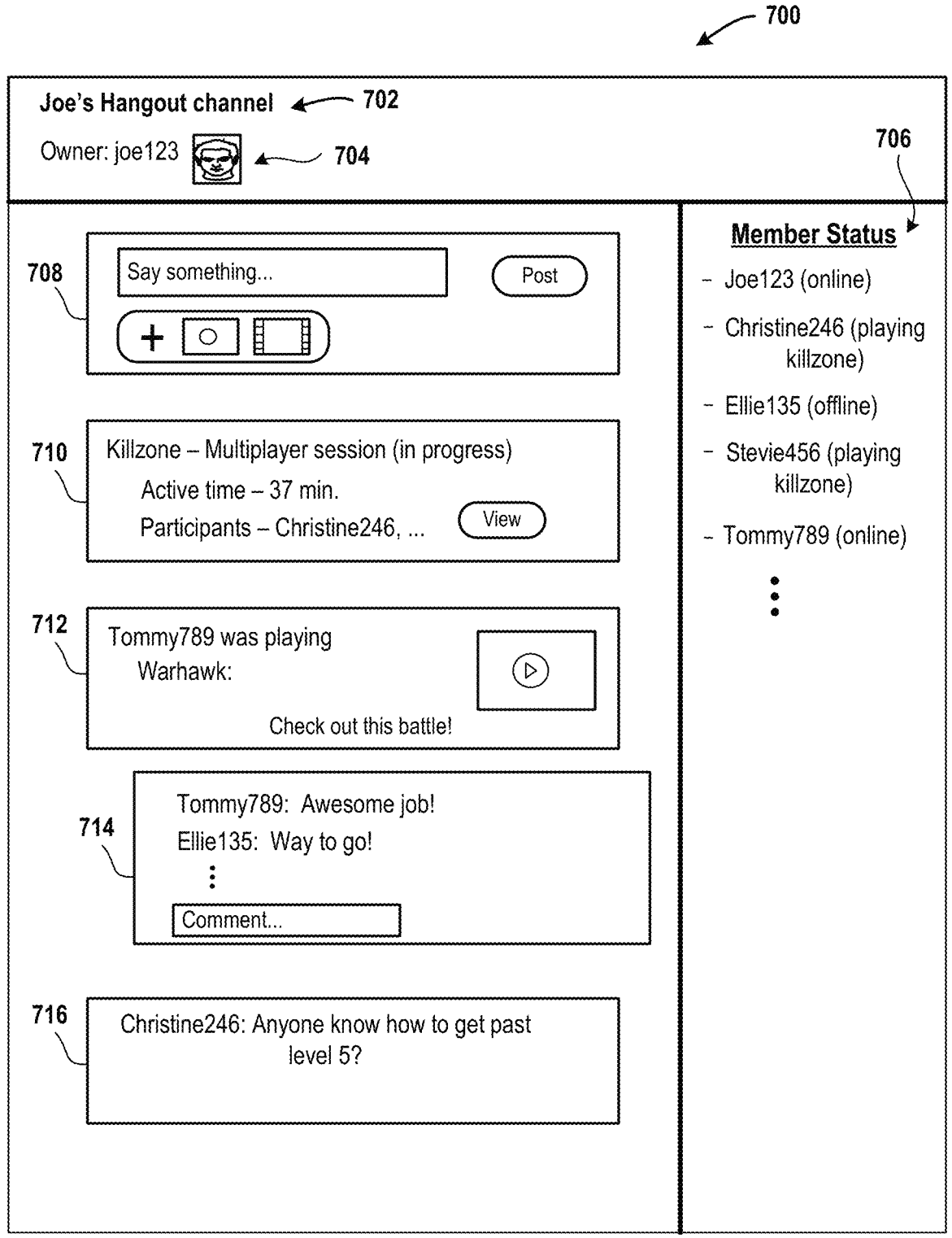
FIG. 7 conceptually illustrates an interface for accessing content from a data channel, in accordance with implementations of the disclosure.

FIG. 7 conceptually illustrates an interface for accessing content from a data channel, in accordance with implementations of the disclosure. In the illustrated implementation, the interface 700 is conceptualized as a stream of content. The data channel can be given a name as shown at ref. 702, and the owner of the data channel can be identified as shown at ref. 704.

In a member status section 706, the current status of members of the data channel are shown. For example, members may be online, offline, engaged in gameplay, etc. It will be appreciated that the owner may have administrative privileges and therefore may be able to add/remove users to/from the data channel, so that users may or may not have access to the content stream of the data channel.

At ref. 708, a posting interface is shown, enabling users to post a comment or picture or video to the data channel content stream. In the stream of content that is part of the interface 700 there can be various types of content as shown. For example, at ref. 710 an update/notification regarding gaming activity is shown, indicating that a gaming session is in progress, and other related information such as the duration of the session and the id's of participants in the session. In some implementations such a content item can provide access to view more detailed information about the session and/or spectate the live gameplay of the session.

The content item 712 is a posting of a video from a gaming session, including a comment by the user posting the video. The item 714 shows reactions from other users to the item 712.

The content item 716 is a text posting, in this case, asking a question for other users of the data channel 100. It will be appreciated that users may post replies to the item 716.

While implementations in accordance with the present disclosure have been described with reference to content derived from cloud gaming, it will be appreciated that the principles and implementations of the present disclosure can also be applied for content derived from console gaming, PC gaming, mobile device gaming, browser-based gaming, social media games, or video games executed on other types of devices and/or in other types of contexts.

Figure 8A:
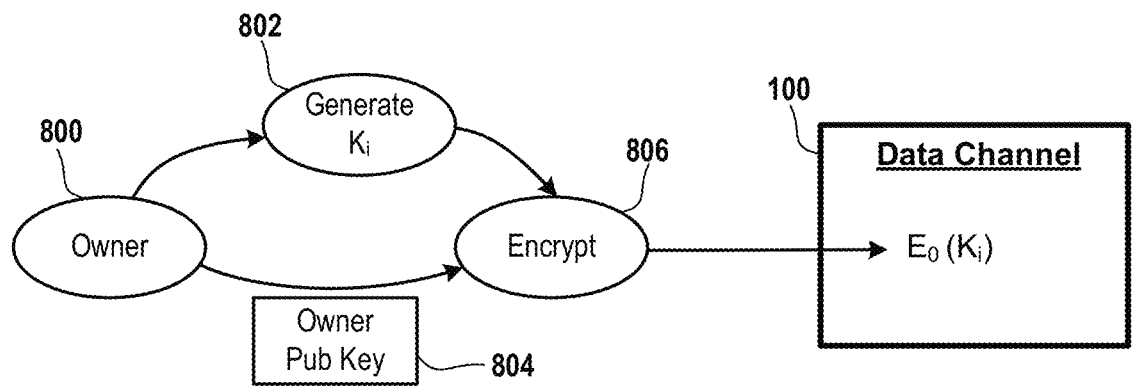
FIG. 8A conceptually illustrates a process for initiating a cryptographically private player social data channel, in accordance with implementations of the disclosure.

FIG. 8A conceptually illustrates a process for initiating a cryptographically private player social data channel, in accordance with implementations of the disclosure. In the illustrated implementation, an owner 800 is setting up the data channel 100. The owner/admin 800 starts the channel by generating a channel key $K_i$, as shown at ref. 802. The channel key $K_i$ is encrypted (ref. 806) using the owner's public key 804, and the encrypted channel key $E_O(K_i)$ is stored to the data channel 100.

Figure 8B:
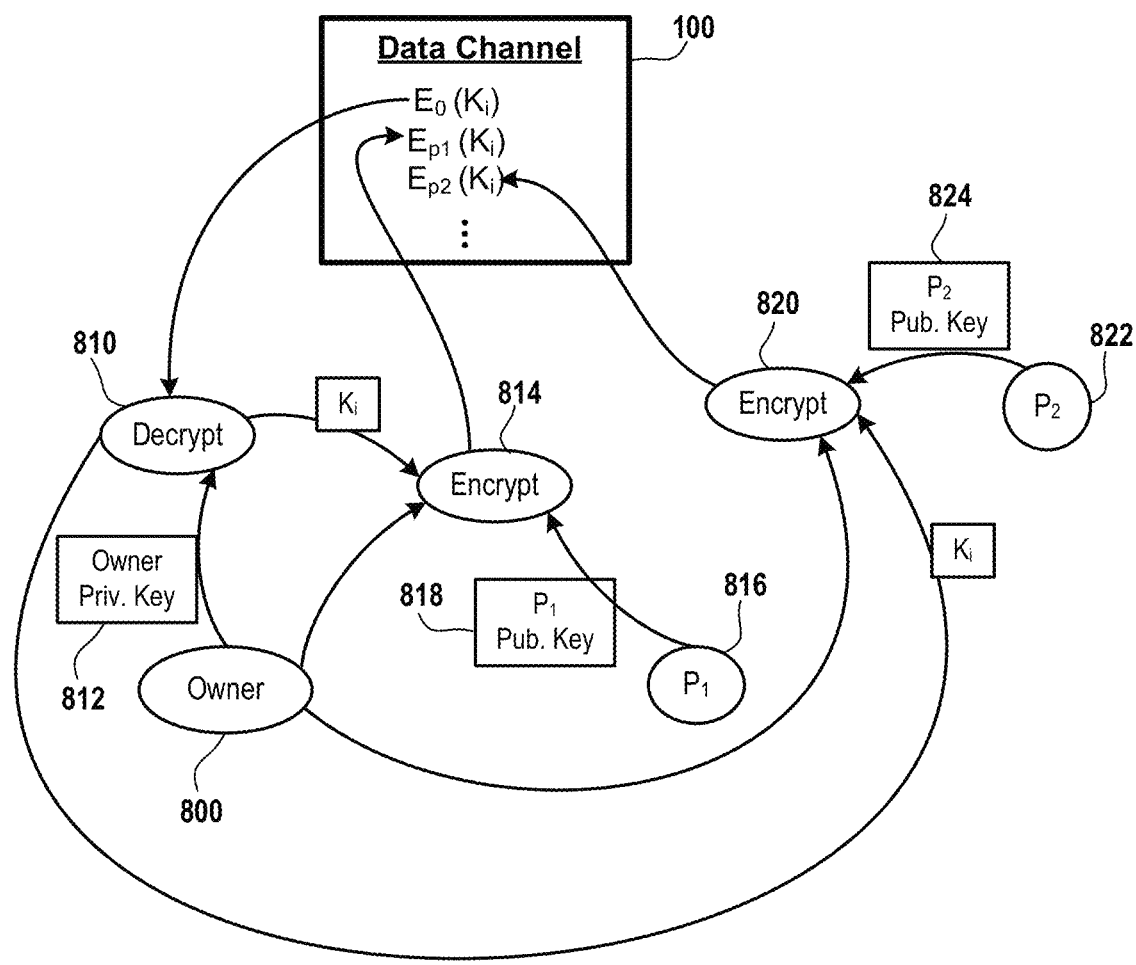
FIG. 8B conceptually illustrates a process for adding participants to the data channel, in accordance with implementations of the disclosure.

FIG. 8B conceptually illustrates a process for adding participants to the data channel, in accordance with implementations of the disclosure. For example, to add a participant/user $P_1$ (ref. 816) to the data channel 100, the owner 800 decrypts (ref. 810) the encrypted channel key $E_O(K_i)$ using the owner's private key 812, to obtain the channel key $K_i$. The channel key $K_i$ is then encrypted (ref. 814) using the public key (ref. 818) of participant $P_1$. The resulting encrypted channel key $E_{P1}(K_i)$ for participant $P_1$ is stored to the data channel 100 as shown. Similarly, to add another participant $P_2$ (ref. 822) to the data channel 100, the decrypted channel key $K_i$, is encrypted (ref. 820) using the public key (ref. 824) of participant $P_2$, and the encrypted channel key $E_{P2}(K_i)$ for participant $P_2$ is stored to the data channel 100.

It will be appreciated that as the owner/admin starts the data channel and adds participants, the encryption of the channel key happens on the owner's device in a zero-trust manner, so that the channel key, and data encrypted using the channel key, is not exposed to any parties other than the owner and the participants. Thus, not even the networked gaming service is privy to the channel key and the encrypted data of the data channel. The data channel can therefore be maintained by the networked gaming service and its systems, without the contents of the data channel becoming exposed to the networked gaming service, as they are stored in an encrypted form. The data channel makes the encrypted keys ($E_O(K_i)$, $E_{P1}(K_i)$, $E_{P2}(K_i)$, etc.) available for all channel members, and as participants join, their encrypted channel keys are added to the channel list, which can be maintained by the networked gaming service.

In some implementations, the channel keys are symmetric (e.g. AES). In some implementations, the owner and participant keys are asymmetric (e.g. RSA, ECC, DS+EG).

Figure 8C:
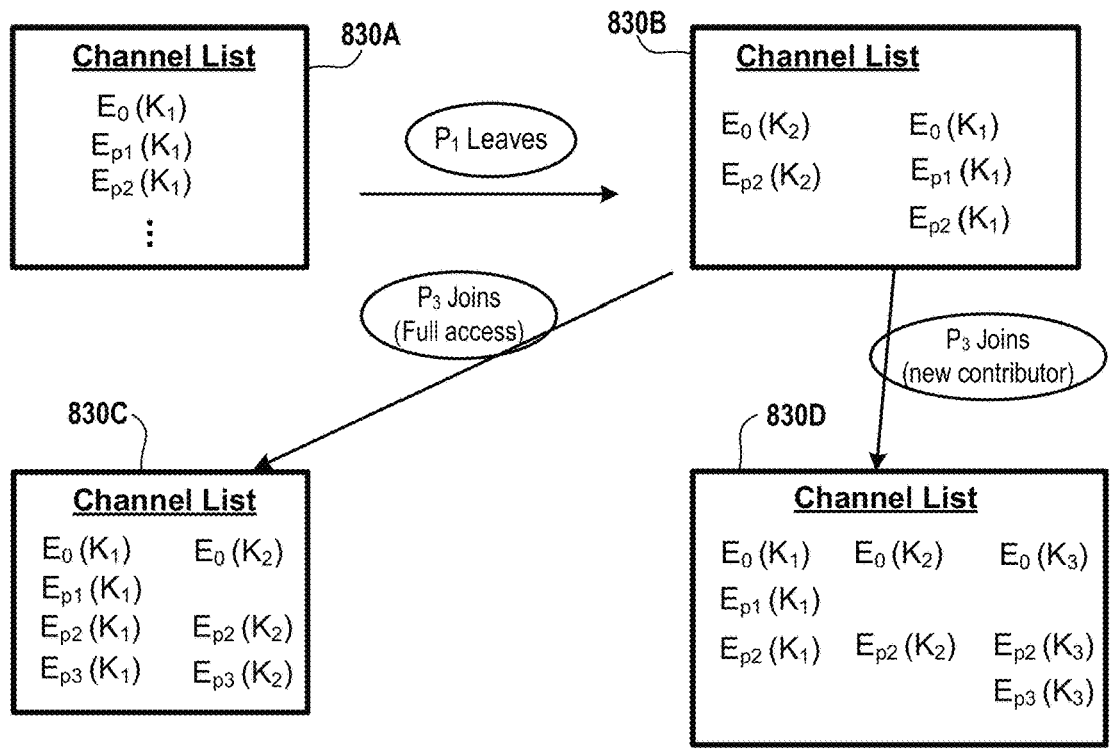
FIG. 8C conceptually illustrates changes to a channel list of encrypted channel keys for a data channel when a user leaves the data channel, in accordance with implementations of the disclosure.

FIG. 8C conceptually illustrates changes to a channel list of encrypted channel keys for a data channel when a user leaves the data channel, in accordance with implementations of the disclosure. As shown, and in accordance with implementations described above, for a data channel having channel members including an owner and participants $P_1$ and $P_2$, a first channel key $K_1$ is generated. The channel key is encrypted with the public keys of the members, and the encrypted channel keys are thus stored to the channel list 830A. As shown in the illustrated implementation, these include encrypted channel keys $E_O(K_1)$, $E_{P1}(K_1)$, and $E_{P2}(K_1)$ for the owner, participant $P_1$, and participant $P_2$ respectively.

When participant $P_1$ leaves (or is removed from the data channel), a second channel key $K_2$ is generated, and encrypted with the public keys of the remaining members of the data channel. In the illustrated implementation, the encrypted channel keys $E_O(K_2)$ and $E_{P2}(K_2)$ are added to the channel list, for the owner and participant $P_2$, respectively. These are in addition to the encrypted channel keys that were encrypted from the first channel key ($E_O(K_1)$, $E_{P1}(K_1)$, and $E_{P2}(K_1)$). In this manner, participant $P_1$ is still able to decrypt old content/messages that is encrypted using the first channel key $K_1$, but will not be able to decrypt new content that is encrypted using the second channel key $K_2$.

With continued reference to FIG. 8C, scenarios are considered if another participant $P_3$ joins the data channel. In some implementations, the participant $P_3$ may be added to the data channel with full access to the entire history of the data channel, enabling the participant $P_3$ to view all historical content of the data channel. In this case, both the first and second channel keys $K_1$ and $K_2$ are encrypted with the public key of the new participant $P_3$, and added to the channel list as encrypted channel keys $E_{P3}(K_1)$ and $E_{P3}(K_2)$, as shown by the channel list at ref. 830C However, in some implementations, the participant $P_3$ may be added to the data channel as a new contributor only, without access to historical content of the data channel, but with access to content shared on the data channel subsequent to the time of their joining. In this case, then a new third channel key $K_3$ is generated, and encrypted with the public keys of the owner and participants $P_2$ and $P_3$. The new encrypted channel keys $E_O(K_3)$, $E_{P2}(K_3)$, and $E_{P3}(K_3)$ are added to the channel list, as shown at ref. 830D.

Figure 8D:
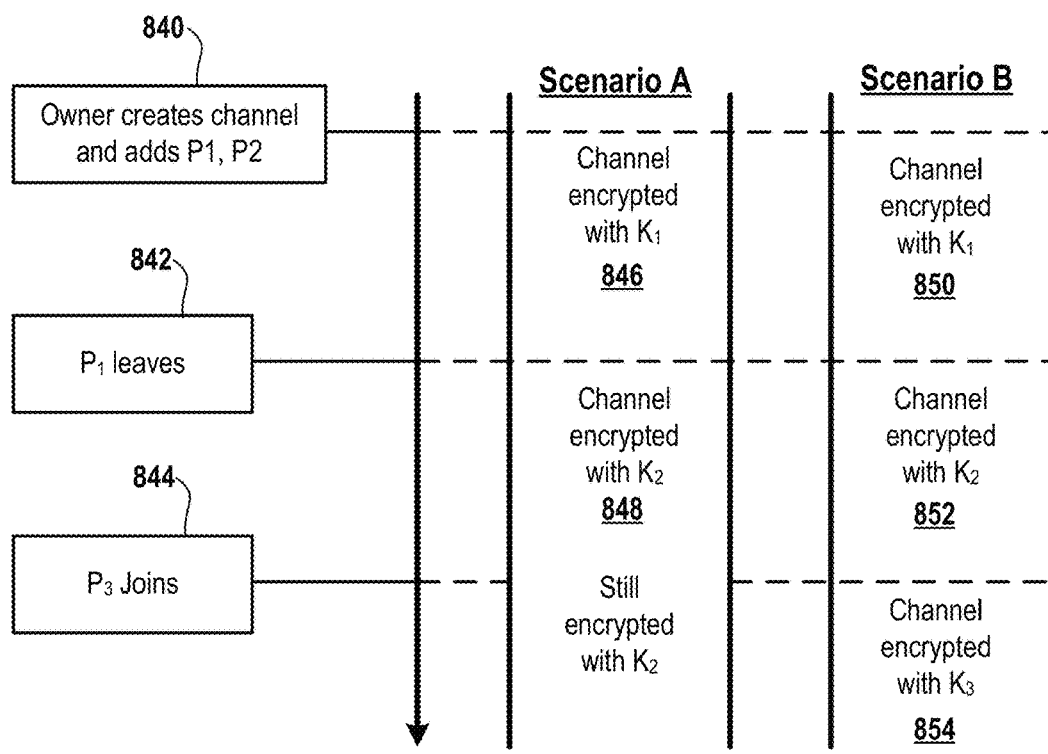
FIG. 8D conceptually illustrates a timeline showing the encryption of content of the data channel over time based on the scenarios of FIG. 8C, in accordance with implementations of the disclosure.

FIG. 8D conceptually illustrates a timeline showing the encryption of content of the data channel over time based on the scenarios of FIG. 8C, in accordance with implementations of the disclosure. In the illustrated implementation, in Scenario A, participant $P_1$ leaves, and participant $P_3$ joins with full access to the channel's history. Whereas in Scenario B, participant $P_1$ leaves, and participant $P_3$ joins without access to the channel's history (but with access to subsequent content). As shown at ref. 840, initially the owner creates the data channel and adds participants $P_1$ and $P_2$. At a subsequent time, as shown at ref. 842, participant $P_1$ leaves. Further subsequent to this, as shown at ref. 844, participant $P_3$ joins the data channel.

Under Scenario A as shown in the illustrated implementation, during time period 846 which is between the channel being created and $P_1$ leaving, the channel is initially encrypted with channel key $K_1$. Then during time period 848, which is after $P_1$ leaves, the channel is encrypted with channel key $K_2$. When participant $P_3$ joins the channel, the channel is still encrypted with channel key $K_2$.

Under Scenario B as shown, during time period 850 which is between the channel being created and $P_1$ leaving, the channel is also initially encrypted with channel key $K_1$. And during time period 852 after $P_1$ leaves, the channel is encrypted with channel key $K_2$. However, when participant $P_3$ joins, then at period 854, the channel is encrypted with new channel key $K_3$.

Figure 8E:
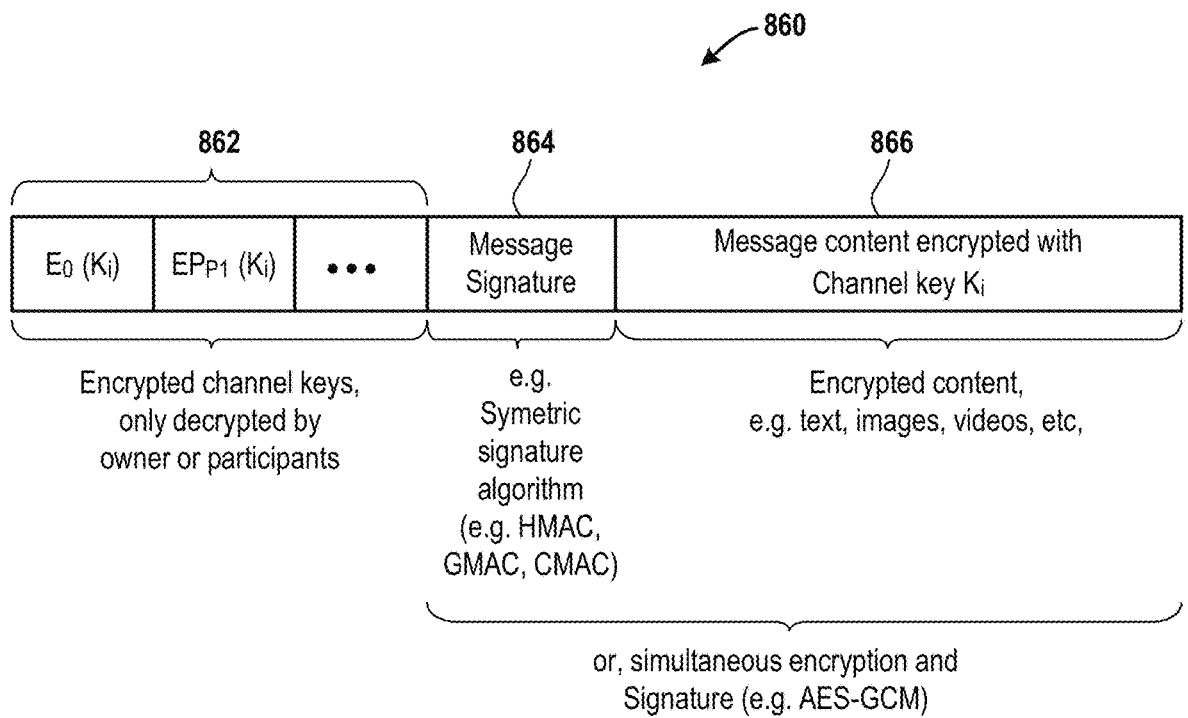
FIG. 8E conceptually illustrates the components of a message in the data channel 100, in accordance with implementations of the disclosure.

FIG. 8E conceptually illustrates the components of a message in the data channel 100, in accordance with implementations of the disclosure. A given message 860 is shown in the illustrated implementation, including encrypted channel keys 862, a message signature 864, and encrypted content 866. The encrypted channel keys 862 include all of the encrypted channel keys that are included in the channel list. It will be appreciated that the encrypted channel keys can only be decrypted by their respective private key holders, which are the owner and the participants that have been granted access to the data channel 100. As has been described, there can be multiple channel keys, and they may be encrypted with the public keys of different subsets of users.

The message 860 further includes a message signature 864. In some implementations the message signature employs a symmetric signature algorithm (e.g. HMAC (Hash-based/Keyed-Hash Message Authentication Code), GMAC (Galois Message Authentication Code), CMAC (Cipher-based Message Authentication Code)).

The message 860 further includes encrypted content 866, that is the content of the message encrypted with the channel key $K_1$. The content can include text, images, video, etc.

In some implementations, the encrypted content 866 and the message signature 864 are generated through the same process at the same time (e.g. using AES-GCM (Advanced Encryption Standard-Galois/Counter Mode).

Thus, each message in the data channel includes the encrypted channel keys, the message signature, and the encrypted message content. When a user (e.g. owner or participant) receives a message, it parses through the message to find the channel key that is encrypted with their public key, and decrypts the channel key. Then the user may use the decrypted channel key to decrypt the content of the message.

It will be appreciated that access to the content of a message is governed via the specific channel key that is used to encrypt the content, and through the management of the encryption of the channel keys. The channel key, which is used to encrypt the content, is encrypted with the public keys of only the specific users who are to be granted access to the content, and these encrypted keys are included with the message. As the channel key is only transmitted in encrypted form, then only the corresponding private key holders are able to access the channel key and decrypt the content. This provides a zero-trust solution from the user's perspective, and not even the networked gaming service, which may store the data channel metadata (but in encrypted form) and administer the channel (e.g. by facilitating communication of data between the users), has access to the content because the networked gaming service is not able to decrypt the channel key. Furthermore, even if a given message is somehow intercepted by another party or mis-sent, the message content is secure because such a receiving party would not be able to decrypt the channel key.

As noted above, the data channel can be administered using the resources of the networked gaming service. For example, the networked gaming service may maintain the channel list, and distribute the channel list to the currently active members of the data channel as needed, such as when a member is removed (providing a new channel key to all remaining members as described above) or a new member is added (providing the channel list to the new member and updating the existing members to include the new encrypted channel key as described above). When members of the data channel generate messages, they may encrypt the content using the current channel key, and may further concatenate the encrypted keys of the channel list. The message can be transmitted to the data channel service/logic/handler of the networked gaming service, for storage and distribution to the other users.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, other user-related data that may require uploading of additional game content. In some embodiments, game content is made available by streaming the game content from the game cloud system to a user's computing device for viewing and interacting. In some implementations, after loading user specific data, the game content is available for game play.

Figure 9A:
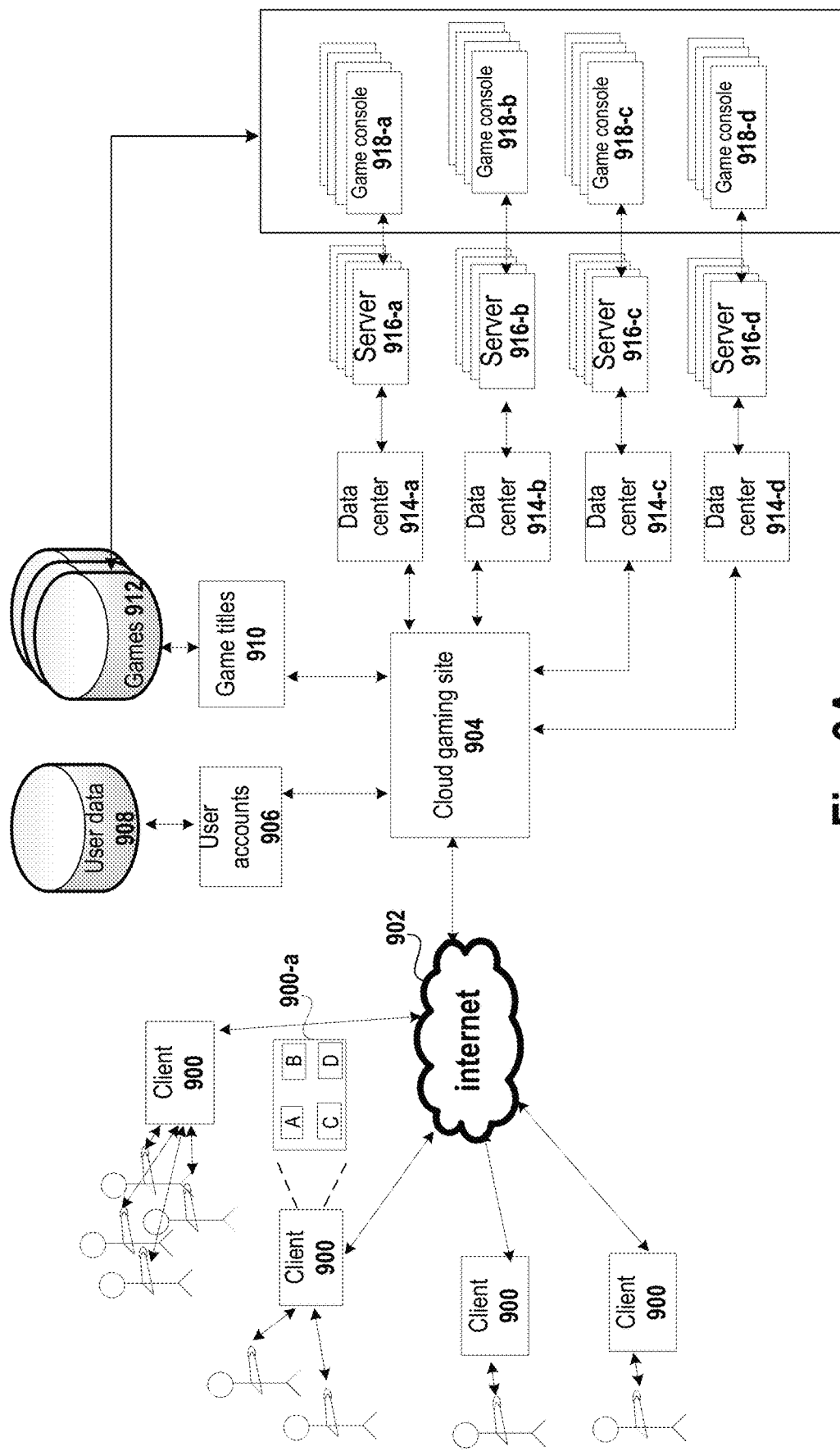
FIG. 9A illustrates a simplified block diagram of an exemplary system that is used to preload game content onto a cloud game server, in accordance with an embodiment of the present disclosure.

FIG. 9A illustrates an exemplary system used to load game files for a game available through a cloud gaming site. The system includes a plurality of client devices 900 that are communicatively connected to the cloud gaming site 904 over a network 902, such as the Internet. When a request to access the cloud gaming site 904 is received from a client device 900, the cloud gaming site 904 accesses user account information 906 stored in a user data store 908 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 910 to identify the game titles that are available at the game cloud site for the user account initiating the request. The game titles data store 910, in turn, interacts with a games database 912 to obtain the game titles for all the games that are available for the cloud gaming site. As new games are introduced, the games database 912 will be updated with the game code and the game titles data store 910 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 900-a, as shown in FIG. 9A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 9B:
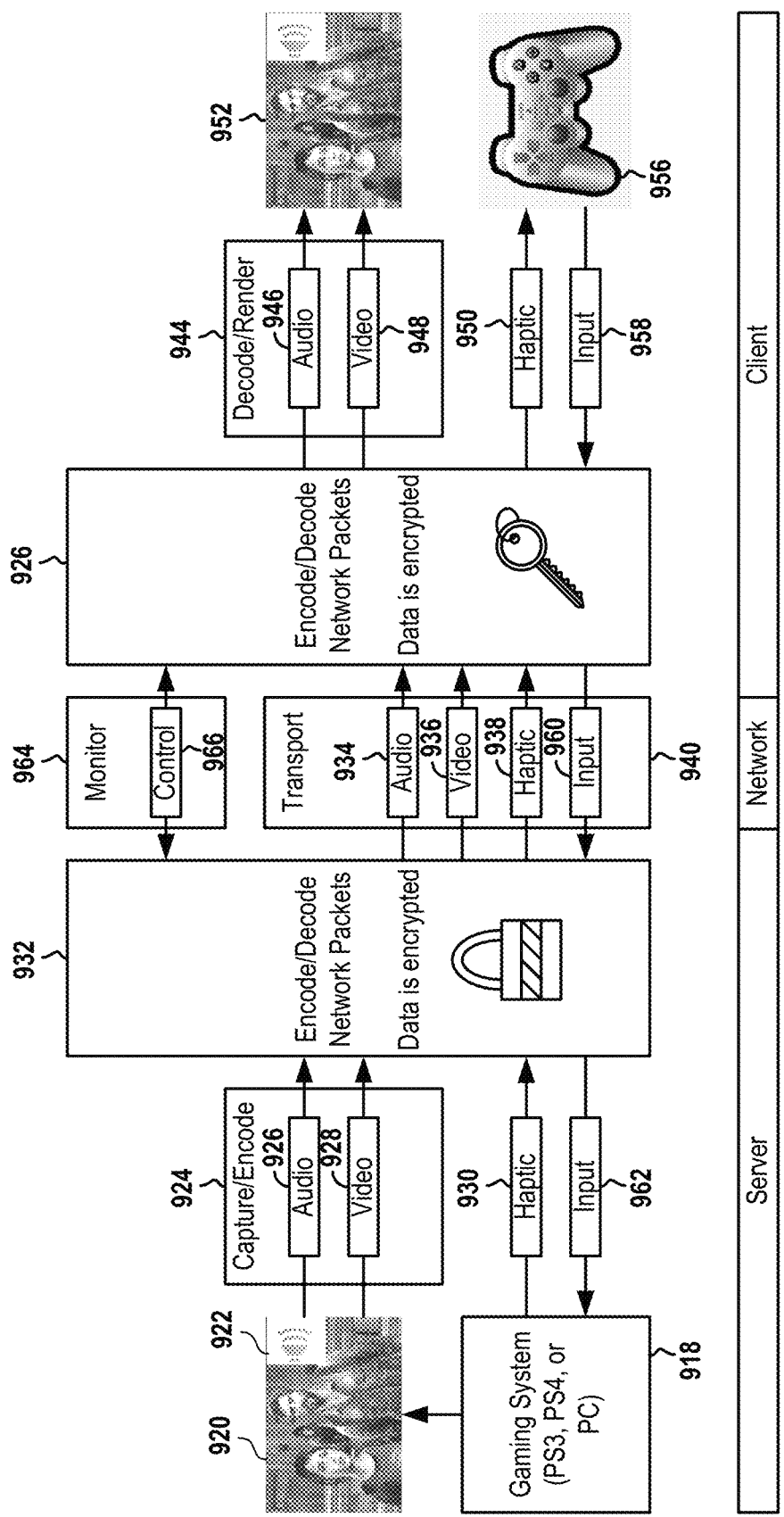
FIG. 9B is a flow diagram conceptually illustrating various operations which are performed for streaming a cloud video game to a client device, in accordance with implementations of the disclosure.

FIG. 9B is a flow diagram conceptually illustrating various operations which are performed for streaming a cloud video game to a client device, in accordance with implementations of the disclosure. The gaming system 918 executes a video game and generates raw (uncompressed) video 920 and audio 922. The video 920 and audio 922 are captured and encoded for streaming purposes, as indicated at reference 924 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 926 and encoded video 928 are further packetized into network packets, as indicated at reference numeral 932, for purposes of transmission over a network such as the Internet. The network packet encoding process can also employ a data encryption process, thereby providing enhanced data security. In the illustrated implementation, audio packets 934 and video packets 936 are generated for transport over the network, as indicated at reference 940.

The gaming system 918 additionally generates haptic feedback data 930, which is also packetized into network packets for network transmission. In the illustrated implementation, haptic feedback packets 938 are generated for transport over the network, as further indicated at reference 940.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 940, the audio, video, and haptic feedback packets are transported over a network, such as and/or including the Internet. As indicated at reference 942, the audio packets 934, video packets 936, and haptic feedback packets 938, are decoded/reassembled by the client device to define encoded audio 946, encoded video 948, and haptic feedback data 950 at the client device. If the data has been encrypted, then the network packets are also decrypted. The encoded audio 946 and encoded video 948 are then decoded by the client device, as indicated at reference 944, to generate client-side raw audio and video data for rendering on a display device 952. The haptic feedback data 950 can be processed/communicated to produce a haptic feedback effect at a controller device 956 or other interface device through which haptic effects can be rendered. One example of a haptic effect is a vibration or rumble of the controller device 956.

It will be appreciated that a video game is responsive to user inputs, and thus, a similar procedural flow to that described above for transmission and processing of user input, but in the reverse direction from client device to server, can be performed. As shown, a user operating controller device 956 may generate input data 958. This input data 958 is packetized at the client device for transport over the network to the cloud gaming system. The input data packets 960 are unpacked and reassembled by the cloud gaming server to define input data 962 on the server-side. The input data 962 is fed to the gaming system 918, which processes the input data 962 to update the game state of the video game.

During transport (ref. 940) of the audio packets 934, video packets 936, and haptic feedback packets 938, the transmission of data over the network can be monitored to ensure the cloud game stream quality of service. For example, network conditions can be monitored as indicated by reference 964, including both upstream and downstream network bandwidth, and the game streaming can be adjusted in response to changes in available bandwidth. That is, the encoding and decoding of network packets can be controlled based on present network conditions, as indicated by reference 966.

Figure 10:
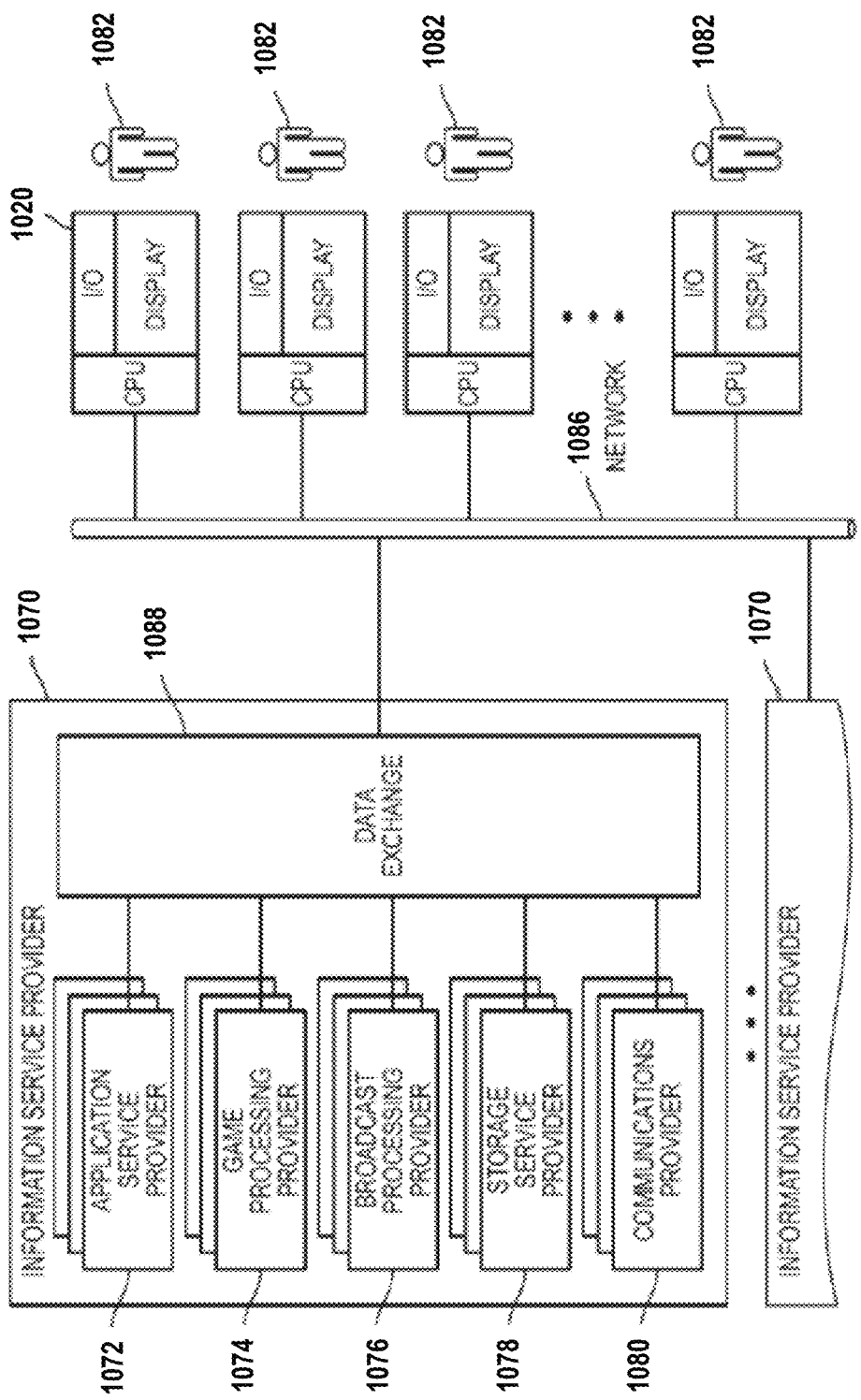
FIG. 10 illustrates an exemplary Information Service Provider architecture for delivering informational content and services to users who are geographically dispersed and connected via a network, in accordance with implementations of the disclosure.

FIG. 10 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A computer implemented method, using a hardware processor, the method comprising:
   initiating a data channel over a computer networked gaming service, including generating a first channel key, the first channel key being used to encrypt content communicated over the data channel, and generating a first encrypted channel key by encrypting the first channel key with a public key associated to an owner of the data channel, wherein the data channel communicates information over the computer networked gaming service;
   adding, using the hardware processor, a participant to the data channel, including generating a second encrypted channel key by encrypting the first channel key with a public key associated to the participant;
   wherein a first message sent via the data channel includes the first encrypted channel key and the second encrypted channel key, such that the first message being sent transmits the first and second encrypted channel keys with encrypted content of the data channel;
   removing the participant from the data channel, including generating a second channel key, and generating a third encrypted channel key by encrypting the second channel key with the public key that is associated to the owner, wherein the second channel key is not encrypted with the public key that is associated to the participant;
   wherein after the removing the participant from the data channel, then a second message sent via the data channel includes the first, second, and third encrypted channel keys, such that the second message being sent transmits the first, second, and third encrypted channel keys with encrypted content of the data channel;
   wherein upon receipt of the first message by a user device associated to the participant, the first channel key is decrypted from the second encrypted channel key using a private key associated to the participant, and the decrypted first channel key is further used to decrypt the encrypted content of the message.

2. The computer implemented method of claim 1, wherein upon receipt of the first message by a user device associated to the owner, the first channel key is decrypted from the first encrypted channel key using a private key associated to the owner, and the decrypted first channel key is further used to decrypt the encrypted content of the message.

3. The computer implemented method of claim 1, further comprising: prior to removing the participant from the data channel, adding a second participant to the data channel, including generating a fourth encrypted channel key by encrypting the first channel key with a public key associated to the second participant.

4. The computer implemented method of claim 3, wherein the first message sent via the data channel further includes the fourth encrypted channel key.

5. A computer implemented method, using a hardware processor, the method comprising:
   receiving, over a computer network from an owner device associated to an owner of a data channel, a first encrypted channel key for the data channel, the first encrypted channel key being a channel key that is encrypted with a public key associated to the owner of the data channel, the channel key being used to encrypt content shared through the data channel, wherein the data channel communicates information over the computer network;
   receiving, over the computer network from the owner device, one or more secondary encrypted channel keys, each secondary encrypted channel key respectively being the channel key that is encrypted with a public key associated to a respective participant of the data channel;
   storing, using the hardware processor, the first encrypted channel key and the one or more secondary encrypted channel keys to a channel list;
   distributing, over the computer network, the channel list to one or more participant devices that are respectively associated to each participant of the data channel;
   wherein communications over the data channel include the first encrypted channel key, the secondary encrypted channel keys, and content encrypted using the channel key, such that said communications transmit the first and the secondary encrypted channel keys with the encrypted content;
   receiving, over the computer network from the owner device a first encrypted second channel key for the data channel, the first encrypted second channel key being a second channel key that is encrypted with the public key associated to the owner of the data channel, the second channel key being used to encrypt content shared through the data channel, to the exclusion of at least one of the participants;
   receiving, over the computer network from the owner device, one or more secondary encrypted second channel keys, each secondary encrypted second channel key respectively being the second channel key encrypted with the public key of one of the participants, wherein the one or more secondary encrypted second channel keys do not include a secondary encrypted second channel key that is the second channel key encrypted with the public key of the at least one of the participants that are excluded;
   updating the channel list to include the first encrypted second channel key and the one or more secondary encrypted second channel keys;

distributing, over the computer network, the updated channel list to the participant devices;

wherein subsequent communications over the data channel include the first encrypted channel key, the secondary encrypted channel keys, the first encrypted second channel key, the secondary encrypted second channel keys, and content encrypted using the second channel key, such that said communications transmit the first and the secondary encrypted channel keys, and the first and the secondary encrypted second channel keys, with encrypted content.

6. The computer implemented method of claim 5, wherein upon receipt of the communication, over the data channel, by the owner device, the channel key is decrypted from the first encrypted channel key using a private key associated to the owner, and the decrypted channel key is further used to decrypt the encrypted content of the communication.

7. The computer implemented method of claim 5, wherein upon receipt of the communication, over the data channel, by a participant device, the channel key is decrypted from a secondary encrypted channel key using a private key associated to the participant, and the decrypted channel key is further used to decrypt the encrypted content of the communication.

8. The computer implemented method of claim 5, further comprising:

storing the communications over the data channel;

storing the subsequent communications over the data channel.

9. The computer implemented method of claim 8, wherein the channel key enables access to the content of the stored communications by the at least one of the participants that are excluded, and wherein the second channel key prevents access to the content of the stored additional communications by the at least one of the participants that are excluded.

10. A non-transitory computer readable medium having program instructions embodied thereon, that, when executed by at least one processor, cause said at least one processor to perform a method including the following operations:

initiating a data channel over a computer networked gaming service, including generating a channel key, the channel key being used to encrypt content communicated over the data channel, and generating a first encrypted channel key by encrypting the channel key with a public key associated to an owner of the data channel, wherein the data channel communicates information over the computer networked gaming service;

adding a participant to the data channel, including generating a second encrypted channel key by encrypting the channel key with a public key associated to the participant;

wherein a message sent via the data channel includes the first encrypted channel key and the second encrypted channel key, such that the message being sent transmits the first and second encrypted channel keys with encrypted content of the data channel;

adding a second participant to the data channel, including generating a second channel key, the channel key being used to encrypt content communicated over the data channel subsequent to the addition of the second participant, and generating a first encrypted second channel key by encrypting the second channel key with the public key associated to the owner of the data channel, generating a second encrypted second channel key by encrypting the second channel key with the public key associated to the participant, and generating a third encrypted second channel key by encrypting the second channel key with a public key associated to the second participant;

wherein after adding the second participant, a subsequent message sent via the data channel includes the first encrypted channel key, the second encrypted channel key, and the first, second and third encrypted second channel keys, such that the message being sent transmits the first and second encrypted channel keys, and the first, second and third encrypted second channel keys, with encrypted content of the data channel;

wherein upon receipt of the message by a user device associated to the owner, the channel key is decrypted from the first encrypted channel key using a private key associated to the owner, and the decrypted channel key is further used to decrypt the encrypted content of the message.

11. The non-transitory computer readable medium of claim 10, wherein upon receipt of the message by a user device associated to the participant, the channel key is decrypted from the second encrypted channel key using a private key associated to the participant, and the decrypted channel key is further used to decrypt the encrypted content of the message.

* * * * *